Dec. 1, 1953　　　　　　　D. A. BELL　　　　　　2,661,393
MECHANICAL SCANNING DEVICE
Filed Oct. 31, 1949　　　　　　　　　　　　2 Sheets-Sheet 1
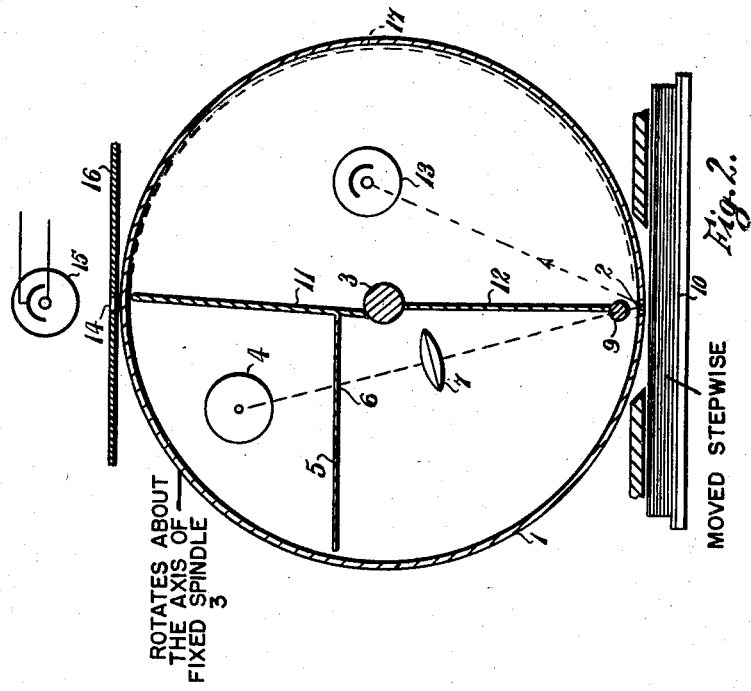
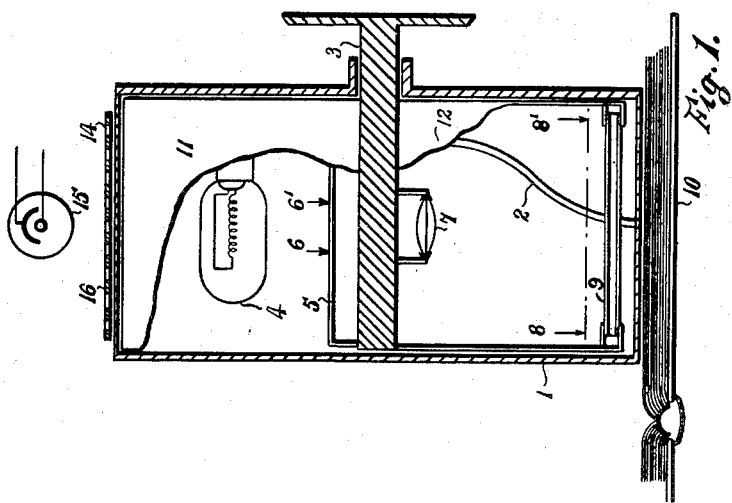
INVENTOR
David A. Bell
By Ralph B. Stewart
Attorney Dec. 1, 1953 — D. A. BELL — 2,661,393
MECHANICAL SCANNING DEVICE
Filed Oct. 31, 1949 — 2 Sheets-Sheet 2
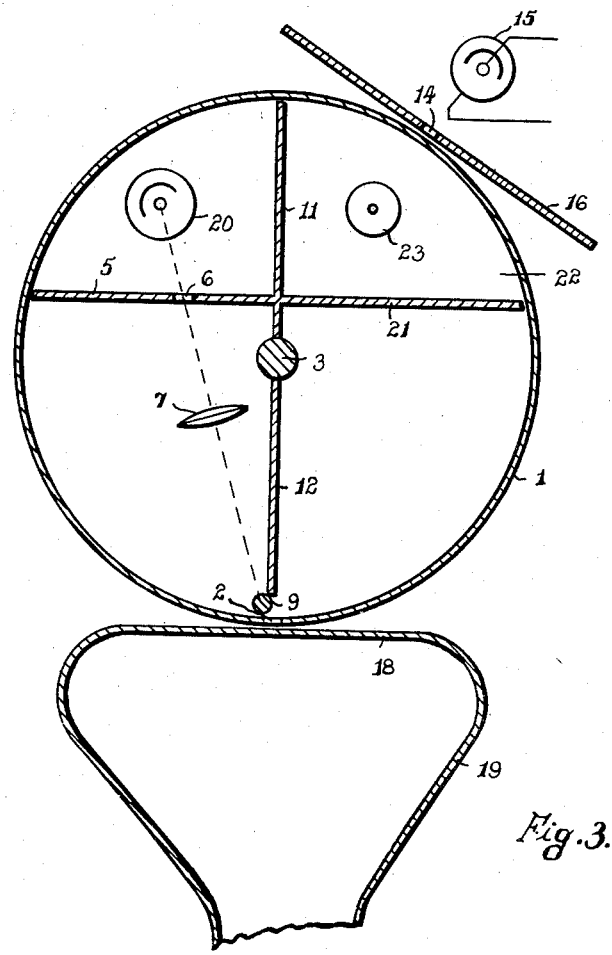
Fig.3.
Fig.4.
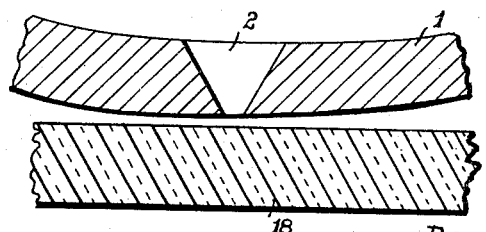
INVENTOR
David A. Bell
By Ralph B. Stewart
Attorney Patented Dec. 1, 1953

2,661,393

UNITED STATES PATENT OFFICE 2,661,393

MECHANICAL SCANNING DEVICE

David Arthur Bell, Birmingham, England, assignor to British Telecommunications Research Limited, Taplow, England, a company of Great Britain Application October 31, 1949, Serial No. 124,637

Claims priority, application Great Britain November 17, 1948

8 Claims. (Cl. 178—7.6)

The present invention relates to mechanical scanning devices for use, for example, in picture telegraphy.

Hitherto it has sometimes been the practice in picture telegraphy to generate picture signals by wrapping the picture to be transmitted around a cylinder. The cylinder is rotated and a narrow pencil of light is directed on to the picture and is given an oscillatory movement in the direction parallel to the axis of the cylinder. In this way the picture is scanned in lines, and light reflected from the picture is directed on to a photoelectric cell which generates signals representative of changes in the light and shade of the picture in the scanned lines.

This arrangement for generating picture signals has the disadvantage that the picture must be of predetermined maximum dimensions and must be formed on flexible material.

It is one object of the present invention to provide an improved mechanical scanning device which is suitable for generating picture signals from a flat picture formed on inflexible material, and of unlimited dimensions.

A further object of the present invention is to provide an improved mechanical scanning device in which novel means are provided for generating synchronising signals.

Another object of the invention is to provide an improved mechanical scanning device suitable for use in generating picture signals from a picture formed by a light pattern as in the case of, for example, a railway traffic indicator utilising a number of lights disposed behind a glass screen, or a display on the screen of a cathode ray tube.

According to the present invention, a mechanical scanning device comprises a hollow cylinder mounted for rotation about the geometrical axis thereof and having a helical slit formed therein, and a mask and a lens system disposed within the cylinder, the mask having a straight slit formed therein and the arrangement being such that the slit in the mask and a narrow straight zone substantially at the outer surface of the cylinder and parallel to the axis thereof, lie in conjugate focal planes of the lens system. When generating picture signals from a picture which is not already illuminated, a light source is disposed on the opposite side of the mask to the lens system. The slit in the mask is then illuminated and the lens system serves to focus an image of the illuminated slit at the outer surface of the cylinder. The only light reaching the picture is that passing through the area of intersection of the helical slit in the cylinder and the image of the illuminated slit in the mask. By rotating the cylinder the light spot so formed scans over a line. A light-sensitive device is disposed within the cylinder and it is so arranged that the only light reaching this device is that reflected from the picture. When generating picture signals from a picture which is already illuminated, such as the aforesaid railway traffic indicator or display on a cathode ray tube screen, a suitable light-sensitive device is disposed on the oposite side of the mask to the lens system. The only light which reaches the light-sensitive device is that passing through the area of intersection of the said zone and the slit in the cylinder.

Two embodiments of the invention will now be described, by way of example, with reference to Figures 1, 2, 3 and 4 of the accompanying drawings, in which Figure 1 is a schematic part-sectional elevation of one embodiment, Figure 2 is a schematic part-section end view of the arrangement of Figure 1, Figure 3 is a schematic part-sectional end view of the second embodiment, and Figure 4 shows a suitable cross-sectional shape of a slit in the cylinder shown in Figures 1, 2 and 3.

Throughout the drawings like parts are given the same reference.

Referring to Figures 1 and 2 a cylinder 1 with closed ends has a helical slit 2 formed therein and is mounted for rotation about a spindle 3. The slit may be filled with transparent material if desired. A light source 4 is disposed to illuminate a slit 6—6' in a mask 5 fixed to the spindle 3 and an image of the slot 6—6' is formed within the cylinder 1 by means of a lens 7, which produces an enlarged image as indicated at 8—8', and a second enlarged image of the slot 6—6' is produced at the outer surface of cylinder 1 by a cylindrical lens 9. The lenses 7 and 9 are rigidly supported upon fixed spindle 3 in any convenient manner.

In this way a light spot is formed at the intersection of the slit image and the slit 2 in the cylinder 1.

In Figures 1 and 2 a page of a book 10 is shown being scanned and rotation of the cylinder 1 causes the light spot to move in a straight line parallel to the plane of the paper in the drawing.

The book 10 is moved continuously or in step-by-step fashion by any suitable means (not shown) such as gear mechanism coupled to the cylinder. The movement of the book is arranged to be such that successive scanned lines just touch one another or are separated by a distance equal to a very small fraction of the width of a line.

Light reflected from the page of the book 10 being scanned is reflected to a photo-electric cell 13 which is supported in fixed relation with respect to fixed spindle 3 and is screened from direct light from the source 4 by means of screens 11 and 12 fixed to the spindle 3. The cell 13 may have the reflected light focused directly on to it by a suitable optical system (not shown), or the inside of the compartment formed by the screens 11 and 12 and the inner surface of a semi-cylindrical, fixed lining shown as a broken line 17, may be painted white to provide an efficient reflecting surface. The inner surface of cylinder 1 is blackened to prevent reflection.

Synchronising signals are generated by disposing an opaque sheet 16 outside the compartment containing the source 4. The sheet 16 contains a number of equally-spaced apertured 14 arranged in a row parallel with the axis of spindle 3. As the cylinder rotates the light falling upon a photo-electric cell 15 is interrupted at a rate dependent upon the speed of rotation of the cylinder 1, and current pulses are produced at the same rate in the cell 15. If desired further synchronising signals may be generated in any suitable manner in dependence upon the movement of the book.

Figure 3 shows an arrangement suitable for use in generating picture signals representing the picture formed on the screen 18 of a cathode ray tube 19. The light source 4 of Figures 1 and 2 is replaced by a photo-electric cell 20, and the arrangement of the mask 5, slit 6 and lenses 7 and 9 is the same as in Figures 1 and 2. The inner surface of the cylinder 1 is blackened as before and the only light reaching the cell 20 is that passing through the area of intersection of the slit 2 and the image of the slit 6 formed at the outer surface of the cylinder 1. Rotation of the cylinder 1 causes this small area to scan over a line and by suitably moving the whole scanning device bodily over the screen 18 the whole of the picture formed on the screen may be scanned line by line.

In order to generate synchronising signals an additional mask 21 is fixed to the mask 11 to form a screened compartment 22. A light source 23 is arranged within this compartment, and the synchronising signals are generated by light passing from the source 23, through the slit 2 and through apertures 14 in succession in the mask 16 to the cell 15 as described with reference to Figures 1 and 2.

In an ideal arrangement of the invention the wall of the cylinder 1 in Figures 1, 2 and 3 would be infinitely thin whereby the slit 2 and the image of the mask 5 could be arranged to lie in the same plane over their area of intersection without loss of light. Results comparable with those given by the ideal arrangement may be achieved in practice by making the cross-section of the slit 2 as shown in Figure 4 which is an enlarged cross-sectional view of part of Figure 3. The width of the narrower end of the cross-section of the slit may conveniently be of the order of 1/100 inch and the angle of taper dependent upon the aperture of the lens 9.

I claim:

1. A mechanical device for scanning a picture to produce picture signals, comprising a hollow cylinder mounted for rotation about its geometrical axis and having a helical slit formed therein, a fixed mask disposed within said cylinder and having a straight slit formed therein, a lens system disposed within the cylinder, said slit in said mask and a narrow straight zone substantially at the outer surface of said cylinder and parallel to the axis thereof lying in conjugate focal planes of the lens system, a device for illuminating said picture, and a light-sensitive device for receiving light from said picture, one of said devices being disposed on the opposite side of said mask with respect to said lens system.

2. A mechanical device for scanning a picture to produce picture signals, comprising a hollow cylinder mounted for rotation about its geometrical axis and having a helical slit formed therein, a fixed mask disposed within said cylinder and having a straight slit formed therein, a lens system disposed within the cylinder, said slit in said mask and a narrow straight zone substantially at the outer surface of said cylinder and parallel to the axis thereof lying in conjugate focal planes of the lens system, a light source disposed on the opposite side of said mask with respect to said lens system to illuminate said straight slit, and a light sensitive device disposed within said cylinder to receive light reflected from said picture.

3. A mechanical device for scanning an illuminated picture to produce picture signals, comprising a hollow cylinder mounted for rotation about its geometrical axis and having a helical slit formed therein, a fixed mask disposed within said cylinder and having a straight slit formed therein, a lens system disposed within the cylinder, said slit in said mask and a narrow straight zone substantially at the outer surface of said cylinder and parallel to the axis thereof lying in conjugate focal planes of the lens system, and a light-sensitive device disposed on the opposite side of said mask with respect to said lens system to receive light passing through the area of intersection of said zone and said helical slit.

4. A mechanical device for scanning a picture to produce picture signals, comprising a hollow cylinder mounted for rotation about its geometrical axis and having a helical slit formed therein, a fixed mask disposed within said cylinder and having a straight slit formed therein, a lens system disposed within the cylinder, said slit in said mask and a narrow straight zone substantially at the outer surface of said cylinder and parallel to the axis thereof lying in conjugate focal planes of the lens system, a device for illuminating said picture, and a light-sensitive device for receiving light from said picture, one of said devices being disposed on the opposite side of said mask with respect to said lens system, and said helical slit being of tapered cross-section, the narrower end of the taper being at the outer surface of said cylinder.

5. A mechanical device for scanning a picture to produce picture signals, comprising a hollow cylinder mounted for rotation about its geometrical axis and having a helical slit formed therein, a fixed mask disposed within said cylinder and having a straight slit formed therein, a lens system disposed within the cylinder, said slit in said mask and a narrow straight zone substantially at the outer surface of said cylinder and parallel to the axis thereof lying in conjugate focal planes of the lens system, a device for illuminating said picture, a light-sensitive device for receiving light from said picture, one of said devices being disposed on the opposite side of said mask with respect to said lens system, and means for generating synchronising signals comprising a member disposed adjacent to and outside said cylinder, said member having a row of equally spaced apertures formed therein parallel with the axis of said cylinder, and a further light-sensitive device arranged to receive light passing from the inside of said cylinder, through said helical slit and through said apertures in said member.

6. A device for scanning a plane picture to produce picture signals comprising a hollow cylinder formed with a helical slit therein, said cylinder being mounted for rotation about its geometrical axis with its outer periphery adjacent the picture, a fixed mask mounted within said cylinder and formed with a linear slit, optical means located within said cylinder and forming an image of said slit co-incident with the outer periphery of said cylinder and in a plane including said geometrical axis, means for illuminating said picture, and a light sensitive device within said cylinder for receiving light transmitted from said picture through the said helical slit.

7. A device for scanning a plane picture to produce picture signals comprising a hollow cylinder formed with a helical slit therein, said cylinder being mounted for rotation about its geometrical axis with its outer periphery adjacent the picture, a fixed mask mounted within said cylinder and formed with a linear slit, optical means located within said cylinder including a fixed cylindrical lens mounted adjacent the inner periphery of said cylinder, for forming an image of said slit coincident with the outer periphery of said cylinder and in a plane including said geometrical axis, means for illuminating said picture, and a light sensitive device within said cylinder for receiving light transmitted from said picture through the said helical slit.

8. A device for scanning a plane picture to produce picture signals comprising a hollow cylinder formed with a helical slit therein, said cylinder being mounted for rotation about its geometrical axis with its outer periphery adjacent the picture, a fixed mask mounted within said cylinder and formed with a linear slit, optical means located within said cylinder and forming an image of said slit coincident with the outer periphery of said cylinder and in a plane including said geometrical axis, means for illuminating said picture, a light sensitive device within said cylinder for receiving light transmitted from said picture through the said helical slit, and means for moving said cylinder relative to said picture in a direction at right angles to the said image.

DAVID ARTHUR BELL.

References Cited in the file of this patent

UNITED STATES PATENTS

| Number | Name | Date |
| --- | --- | --- |
| 1,540,318 | Dunajeff | June 2, 1925 |
| 1,854,014 | Ballentine | Apr. 12, 1932 |
| 1,863,363 | Zworykin | June 14, 1932 |
| 1,925,814 | Nicolson | Sept. 5, 1933 |
| 1,945,968 | Amicis | Feb. 6, 1934 |
| 2,085,556 | Trainer | June 29, 1937 |
| 2,185,640 | Lubcke | Jan. 2, 1940 |
| 2,209,719 | Rustad | July 30, 1940 |
| 2,298,911 | Young | Oct. 13, 1942 |
| 2,435,250 | Tandler et al. | Feb. 3, 1948 |
| 2,532,799 | Young | Dec. 5, 1950 |

FOREIGN PATENTS

| Number | Country | Date |
| --- | --- | --- |
| 301,327 | Great Britain | May 9, 1929 |